No. 814,077. PATENTED MAR. 6, 1906.
F. P. PRENDERGAST.
WHEEL CONSTRUCTION.
APPLICATION FILED JULY 31, 1905.
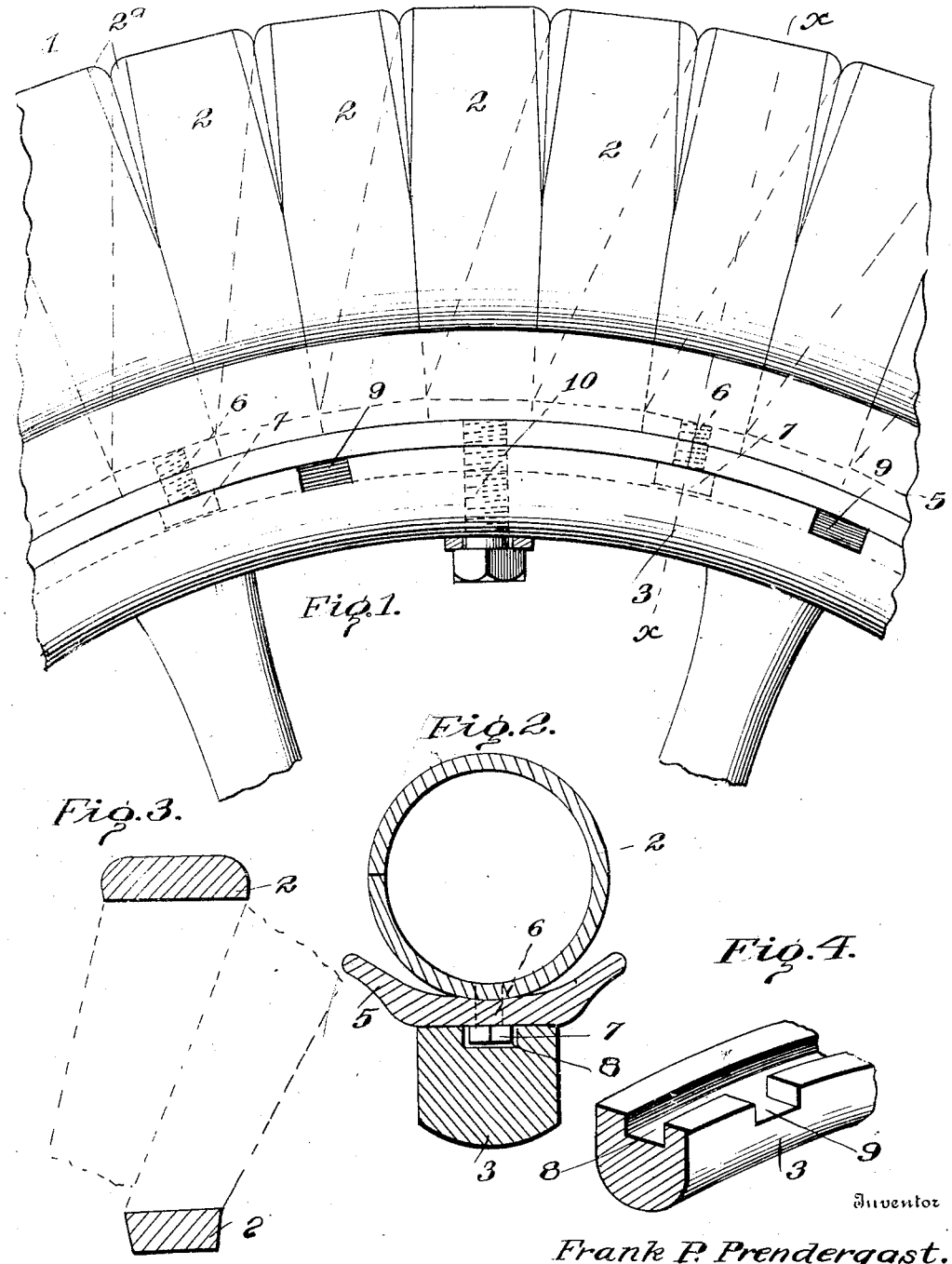
Inventor
Frank P. Prendergast.

UNITED STATES PATENT OFFICE.

FRANK P. PRENDERGAST, OF DAGUS MINES, PENNSYLVANIA.

WHEEL CONSTRUCTION.

No. 814,077.

Specification of Letters Patent.

Patented March 6, 1906.

Application filed July 31, 1905. Serial No. 272,069.

*To all whom it may concern:*

Be it known that I, FRANK P. PRENDERGAST, a citizen of the United States, residing at Dagus Mines, in the county of Elk and State of Pennsylvania, have invented certain new and useful Improvements in Wheel Construction, of which the following is a specification.

This invention embodies improvements in wheel structure, and aims to provide a novel form of tire for wheels and peculiar securing means therefor, including a special form of rim or felly structure for the wheel and a peculiar form of channel-iron.

For a full description of the invention and the merits thereof and also to acquire a knowledge of the details of construction of the means for effecting the result reference is to be had to the following description and accompanying drawings, in which--

Figure 1 is a side elevation of the wheel partially broken away, showing the application of the invention, certain parts of the securing means being shown in dotted lines. Fig. 2 is a transverse sectional view taken about on the line *x x* of Fig. 1. Fig. 3 is a vertical section through one of the coils of the tire and taken about at a right angle to the line of the section *x x* represented by Fig. 2. Fig. 4 is a perspective view showing a portion of the tire of the wheel, bringing out clearly the formation of the circumferential groove and lateral grooves leading thereto at intervals.

Corresponding and like parts are referred to in the following description and indicated in all the views of the drawings by the same reference characters.

In the practical embodiment of the invention it is designed to provide a tire which will be an effective substitute for the present rubber tires most commonly in use, the tire embodying the invention being indicated at 1 and consisting of a length or strip of metal coiled upon itself to form a plurality of adjacent spring coils or volutes 2, the outer portions of each coil or volute 2 being wider than the innermost portions, as shown most clearly in Fig. 3 of the drawings, in order that the outer portions of the several coils may be in contact with each other, being freely movable as the weight is received thereon to yield and subserve the resilience of the tire under actual conditions of service. The edge portions of the outer portions of the coils 2 of the tire 1 are rounded, as shown at 2ª, so that this portion can move freely in the manner before described. The felly 3 of the wheel has the spokes attached thereto in any conventional way, and said felly has the channel-iron disposed thereon, said channel-iron being of a size to permit of ready compression of the coils 2 and the tire as weight is received thereon. As shown in Fig. 2, the sides of the channel-iron are spaced somewhat from the inner portions of the coils 2, thereby admitting of a compressing action of the coils, expanding the inner portions in a manner which will be readily evident.

The tire 1 is peculiarly attached to the channel-iron 5, certain of the coils of the tire at predetermined intervals in its length having threaded fastenings 6 attached thereto. The fastenings 6 embody a threaded shank provided with a square or rectangular-shaped head 7, the shank being adapted to screw into an opening in the coil 2, to which the fastening is secured, said shank passing through the opening in the channel-iron 5 in order that the fastenings may secure the tire firmly to said channel-iron. The fastenings 6 are not only utilized to secure the tire 1 to the channel-iron, but said fastenings are adapted to interlock the channel-iron with the felly 3 by reason of the peculiar construction of the parts. For this purpose the felly 3 is provided with a circumferential groove 8, and leading from the side of the felly and the groove 8 are a plurality of transverse or lateral grooves or passages 9. The passages 9 are situated at intervals in the circumference of the felly, determined by the intervals between the fastenings 6 of the tire, the above being necessary in order that after the tire has been secured to the channel-iron the heads 7 of the fastenings 6, which project from the inner side of the channel-iron, may be forced into the lateral grooves 9 on the felly by moving the channel-iron and tire laterally thereon. When the tire 1 and the channel-iron 5 are bodily moved laterally or transversely on the felly, the heads 7 of the fastenings 6 register with the grooves 9. As soon as the heads 7 enter the grooves 8 the channel-iron and tire may be moved circumferentially with reference to the felly, and this will cause the heads 7 of the fastenings 6 to be interlocked with the felly by the disposition of said heads in the circumferential groove 8. When the channel-iron and the tire are thus connected with the felly, suitable fastenings 10, preferably consisting of threaded parts, are screwed through the felly from the inner side thereof in the openings 11 in the channel-iron 5, and said parts 10 will prevent circumferential movement of the channel-iron on the felly and secure the channel-iron and tire in position, preventing displacement of the parts in a manner which will be clear. To remove the tire from the channel-iron, it is first necessary to remove the fastenings 10 and by circumferential movement of the channel-iron cause the heads 7 of the fastenings 6 to register with the grooves 9, whereupon lateral movement of the channel-iron will throw the same off of the felly 3. The tire 1 can now be removed from the channel-iron, if this is necessary.

It will be noted that the form of the heads 7 of the fastenings 6, which are rectangular in shape, is such that the said heads when snugly received in the groove 8 are prevented from turning, and likelihood of the same being unscrewed from the tire is entirely obviated.

Having thus described the invention, what is claimed as new is—

1. In combination, a felly, a channel-iron, a tire, and fastenings securing the tire to the channel-iron and adapted to interlock the channel-iron with the felly by a lateral and circumferential movement of the channel-iron on the felly.

2. In combination, a felly, a channel-iron, a tire, and fastenings securing the tire to the channel-iron and provided with heads projecting from the inner side of the channel-iron, the felly being provided with a circumferential groove to receive the fastenings of the tire to interlock the channel-iron with the felly.

3. In combination a felly provided with a circumferential groove, and lateral grooves leading thereto, a channel-iron, a tire on the channel-iron, fastenings securing the tire to the channel-iron and having the heads thereof projecting from one side of the channel-iron, the fastenings of the tire being situated at intervals equal to the intervals between the lateral slots on the felly, whereby the heads of the said fastenings may be passed into the lateral slots on the felly, and by circumferential movement of the channel-iron caused to interlock in the circumferential groove thereof, and means for preventing circumferential movement of the channel-iron after the same has been interlocked with the felly.

4. In combination, a felly, a channel-iron thereon, a tire on the channel-iron, means carried by the channel-iron adapted to interlock the same with the felly, by lateral and circumferential movement of the channel-iron on the felly, and means for preventing circumferential movement of the channel-iron after the same has been interlocked with the felly.

5. In combination, a felly, a channel-iron, a tire composed of a metallic strip coiled upon itself to form a plurality of spring-coils, and fastenings securing the coils of the tire at intervals to the channel-iron, said fastenings being adapted to be interlocked with the felly by lateral and circumferential movement of the channel-iron thereon.

In testimony whereof I affix my signature in presence of two witnesses.

FRANK P. PRENDERGAST. [L. S.]

Witnesses:
F. R. HUMPHREYS,
J. W. FERMAN.